(12) United States Patent
Chafin

(10) Patent No.: US 9,731,740 B1
(45) Date of Patent: Aug. 15, 2017

(54) CART FOR LOADING HEAVY EQUIPMENT INTO A VEHICLE

(71) Applicant: APi Group, Inc., New Brighton, MN (US)

(72) Inventor: Brad Chafin, Memphis, TN (US)

(73) Assignee: API GROUP, INC., New Brighton, MN (US)

( * ) Notice: Subject to any disclaimer, the term of this patent is extended or adjusted under 35 U.S.C. 154(b) by 29 days.

(21) Appl. No.: 15/083,868

(22) Filed: Mar. 29, 2016

(51) Int. Cl.
*B62B 3/00* (2006.01)
*B62B 3/02* (2006.01)

(52) U.S. Cl.
CPC .................................. *B62B 3/025* (2013.01)

(58) Field of Classification Search
None
See application file for complete search history.

(56) References Cited

U.S. PATENT DOCUMENTS

| | | | | |
|---|---|---|---|---|
| 2,841,438 A | * | 7/1958 | Weil | B62B 5/0003 280/641 |
| 4,767,148 A | * | 8/1988 | Ferneau | A61G 1/0567 296/20 |
| 5,509,159 A | * | 4/1996 | Du-Bois | A61G 1/013 296/20 |
| 6,976,696 B2 | * | 12/2005 | O'Krangley | A61G 1/0562 280/638 |
| 7,100,224 B2 | * | 9/2006 | Knipfel | A61G 1/0565 5/620 |
| 7,617,549 B2 | * | 11/2009 | Pollock | A61G 1/013 296/20 |
| 7,631,373 B2 | * | 12/2009 | Broadley | A61G 1/0293 296/20 |
| 8,640,283 B2 | * | 2/2014 | Broadley | A61G 1/0562 296/20 |
| 9,114,047 B2 | * | 8/2015 | Magill | A61G 1/02 |
| 2006/0225203 A1 | | 10/2006 | Hosoya et al. | |
| 2011/0018296 A1 | | 1/2011 | Broadley et al. | |

* cited by examiner

*Primary Examiner* — John Walters
*Assistant Examiner* — Hilary L Johns
(74) *Attorney, Agent, or Firm* — Fredrikson & Byron, P.A.

(57) ABSTRACT

Embodiments include a foldable cart and methods of folding a cart for loading into a vehicle. In an illustrative embodiment, the leading legs are foldable from a use position to a collapsed position. To facilitate folding of the leading legs, the cart includes a leading leg folding system having: i) a release mechanism, ii) one or more leading leg supports to transfer motion from the release mechanism to the leading legs, and iii) an actuation system including an actuator wheel to initiate release of the release mechanism. The actuation system provides automatic release and folding of the leading legs during loading into the vehicle.

20 Claims, 18 Drawing Sheets

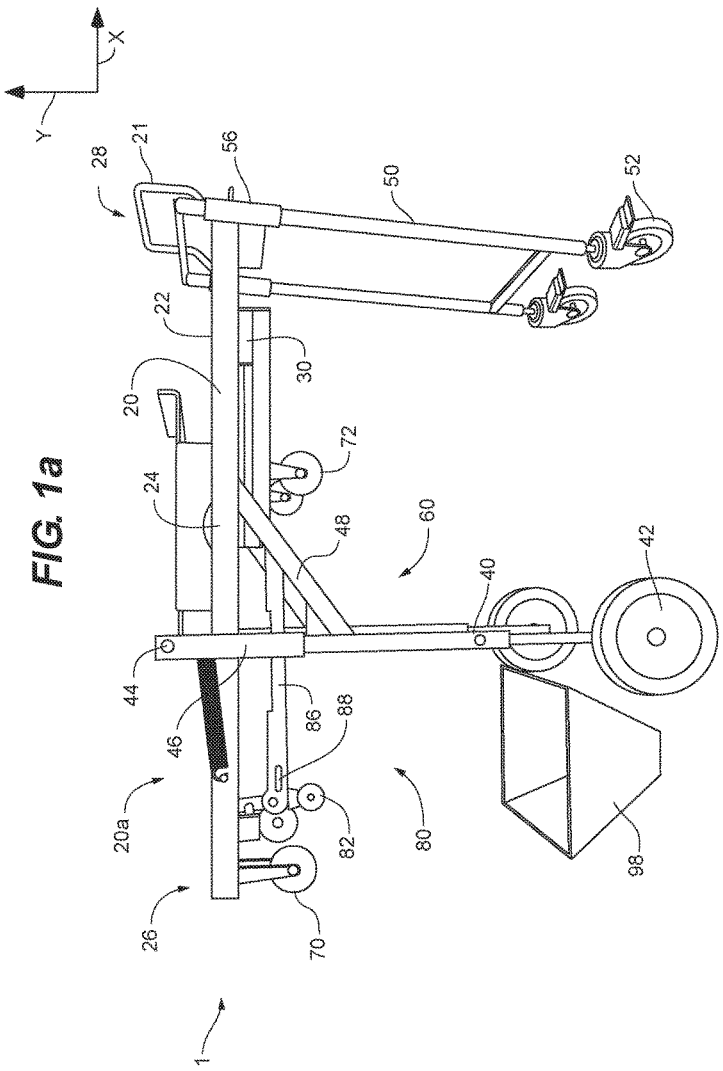

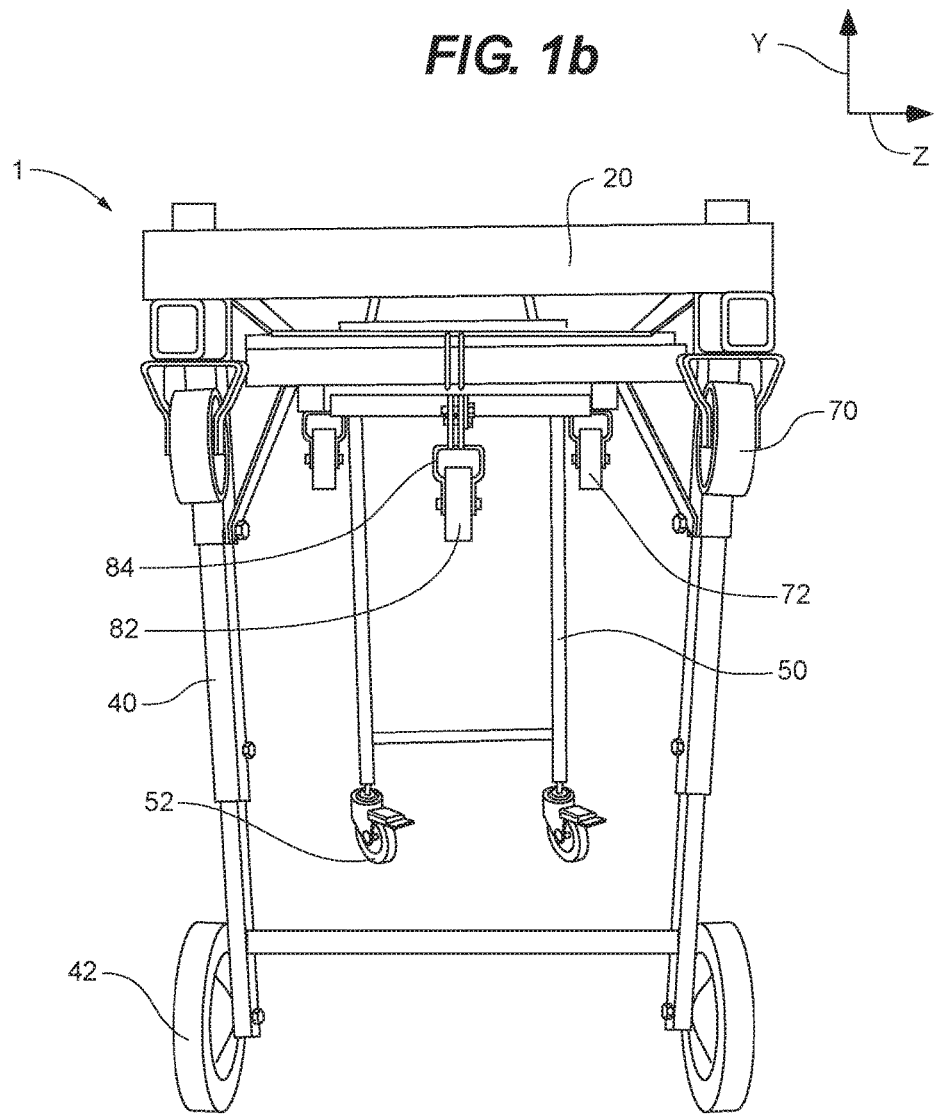

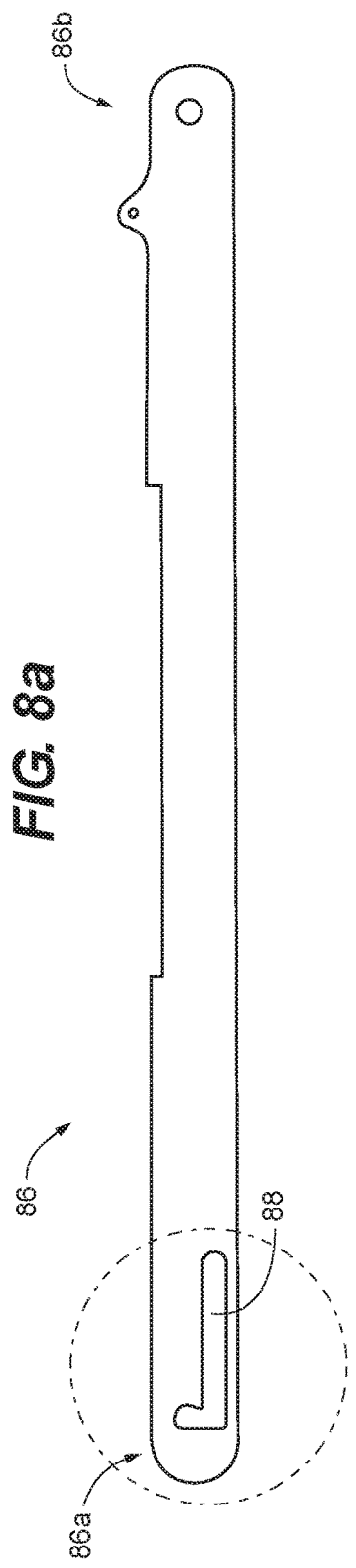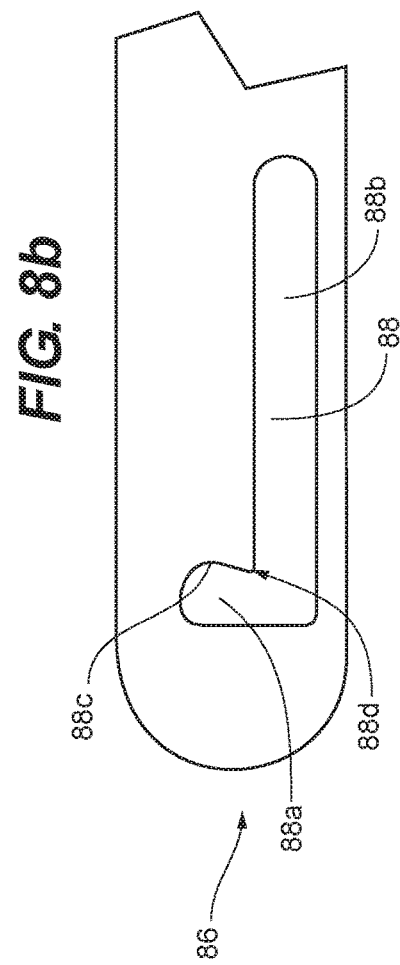
FIG. 8a
FIG. 8b

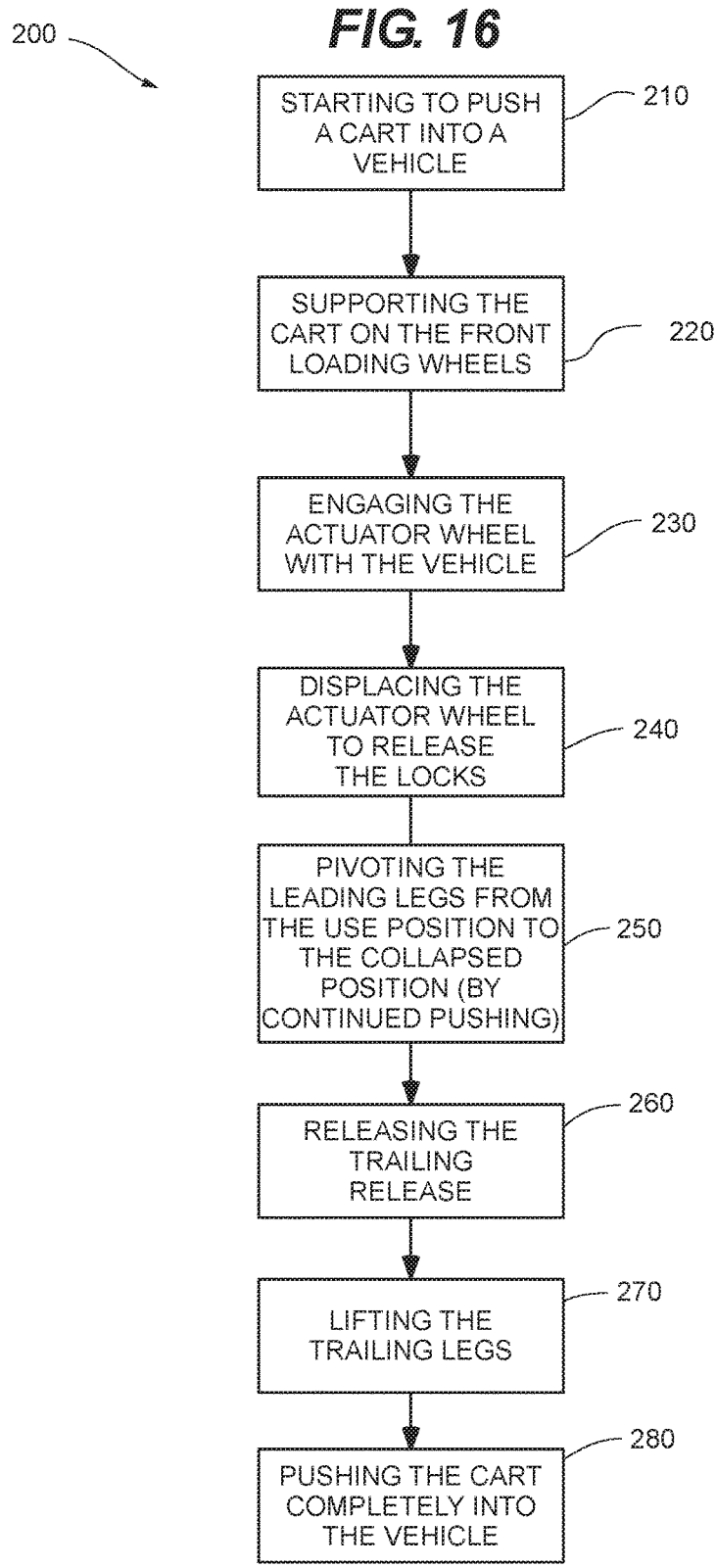

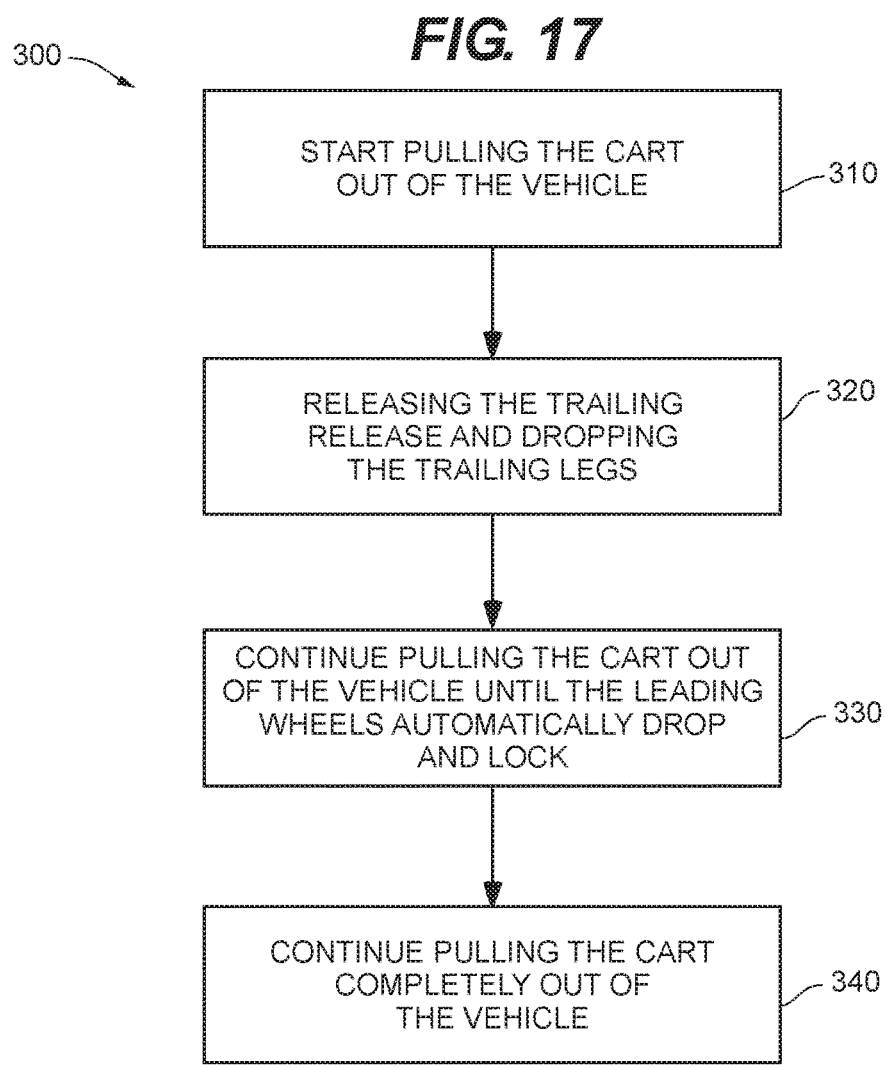

CART FOR LOADING HEAVY EQUIPMENT INTO A VEHICLE

BACKGROUND

Carts for transporting items such as equipment can be helpful. However, if the equipment needs to be loaded into a vehicle, it can be difficult to load the equipment and/or the cart that the equipment resides on, into the vehicle. In some cases, the cart may need to be lifted up into the vehicle or the items have to be dismantled from the cart. This is particularly difficult and potentially dangerous when the items are heavy.

SUMMARY

In general, this disclosure is directed to foldable carts for loading into a vehicle. The foldable carts may be used for, but are not limited to, transporting items such as equipment. Embodiments of the cart described herein may be used with a vehicle having a loading opening. The loading opening may include a load entry surface that the cart interfaces with during loading.

Embodiments of the present invention provide a foldable cart. In an illustrative embodiment of a foldable cart, the foldable cart includes a support frame having a support surface to support the weight of an item being carried. The support frame may extend from a leading end portion to a trailing end portion along a support frame plane. The support frame may include a pair of rails extending from the leading end portion to the trailing end portion along a support frame plane. The support frame may include two tracks. In some embodiments the rails may include or be coupled to the tracks.

In the illustrative embodiment, a pair of leading legs and a pair of trailing legs are coupled to the support frame. The leading legs are pivotally coupled to the support frame at a pivot location. The pivot location may be located closer to the leading end of the support frame than the trailing end of the support frame. The pair of leading legs may be described as extending along a leading leg plane.

In the illustrative embodiment, the leading legs are foldable so that the cart may be re-configured for loading into the vehicle. To facilitate folding of the leading legs, the cart includes a leading leg folding system including: a release mechanism, one or more leading leg supports to transfer motion from the release mechanism to the leading legs, and an actuation system to release the release mechanism. The leading leg folding system allows the leading legs of the cart to be released from a use position to a collapsed position. When the actuation system is actuated, the release mechanism is released, and the leading legs are allowed to be folded from the use position to the collapsed position.

In the illustrative embodiment, the release mechanism may include: a slideable track bar, and a lock to lock the track bar in place. In the illustrative embodiment, the track bar extends from the track of one rail to the track of the other rail. The track bar is slideable in the tracks that are part of the support frame.

In the illustrative embodiment, the leading leg supports are provided for transferring motion of the track bar to the leading legs, each of the leading leg supports being pivotably coupled to one of the leading legs and extending to and coupled to the track bar. The leading leg supports transfer sliding movement of the track bar to the leading legs. For example, the leading leg supports may be arranged to convert sliding movement of the track bar into pivoting motion of the leading legs.

In other words, when the lock is engaged with the track bar, the leading legs are maintained in the use position. In contrast, when the lock is released from the track bar, the track bar is allowed to slide in the tracks. This sliding movement of the track bar is transferred, via the leading leg supports, to the leading legs allowing the leading legs to fold to the collapsed position.

As previously described, the illustrative embodiment of the cart's leg folding system also includes an actuation system to initiate automatic release of the release mechanism. In the illustrative embodiment, the actuation system includes an actuator wheel located along the support frame in between the leading end portion and the pivot location.

The actuator wheel is coupled to the support frame by a wheel mount. The wheel mount is pivotably coupled to the support frame at one end and has a free end opposite the pivotable coupling to the support frame. The actuator wheel may be coupled to the free end of the wheel mount.

In the illustrative embodiment, in addition to the actuator wheel being coupled to the wheel mount, the wheel mount is also coupled to a displaceable actuator bar, such as by a through bolt or any other suitable coupling means. The actuator bar provides a means for transferring motion of the actuator wheel to the release mechanism. The actuator bar may extend from a first end portion to a second end portion. An actuation slot is disposed in the actuator bar, generally located in (e.g., disposed in, at, near, proximate) the first end portion of the actuator bar. The wheel mount is slideably coupled to the actuation slot in a manner that, when the actuator wheel is actuated, relative motion of the actuator wheel with respect to both the support frame and with respect to the actuator bar is facilitated.

The second end portion of the actuator bar includes a coupling that transfers the motion of the actuator wheel (via the actuator bar) to the lock, to release the lock. For example, the second end portion of the actuator bar may be pivotably coupled to a lock bar mount that is fixedly coupled to the lock of the release mechanism. The lock bar mount and the lock may be coupled (e.g., fixedly) to each other via an intermediate lock bar.

In the illustrative embodiment, when the cart is loaded into the vehicle and the actuator wheel engages with the load entry surface of the vehicle (e.g., a ramp or plate), the actuator wheel is actuated and displaced opposite the direction of motion of the cart. When the actuator wheel is displaced opposite the direction of motion of the cart, the arrangement of the actuation system causes rotation of the lock bar thereby releasing the lock from the track bar. In some embodiments the actuator wheel is not only displaced opposite the direction of motion of the cart, but is also displaced vertically when engaged with the load entry surface.

Actuation of the actuation system described above causes the lock to be released from the track bar, and thus the track bar is allowed to slide in the tracks opposite the direction of motion of the cart causing motion to be transferred via the leading leg supports to the leading legs to pivot the leading legs from the use position to the collapsed position.

In an illustrative method of loading a foldable cart into a vehicle having a loading opening including a load entry surface, the method may include providing a foldable cart such as the illustrative cart described above. The illustrative cart may further include loading wheels mounted to a leading end portion. Other embodiments and variations of the foldable cart may also be used with the illustrative method. Additionally, other embodiments and variations of the method may also be used with the illustrative cart.

Steps of the method of loading a foldable cart into a vehicle include pushing the cart into the vehicle. Pushing the cart into the vehicle includes supporting at least a portion of the weight of the cart on the loading wheels of the cart before collapsing (e.g., folding, pivoting) of the leading legs occurs.

The method further includes engaging the actuator wheel with the load entry surface to actuate the actuator wheel and thereby displacing the actuator wheel opposite the direction of motion of the cart. Engaging the actuator wheel displaces the actuator bar opposite the direction of motion of the cart thereby causing rotation of the lock bar to release the lock from the track bar. Releasing the lock from the track bar allows the track bar to slide in the tracks in the direction opposite the direction of motion of the cart and the leading legs to pivot from the use position to the collapsed position.

The illustrative method may further include pushing the cart completely into the vehicle. The illustrative method may include other steps before pushing the cart completely into the vehicle. In some embodiments the cart may not be pushed completely into the vehicle or a portion of the cart may remain exposed to the environment external to the vehicle.

In another illustrative embodiment of a foldable cart for loading in a vehicle, the cart may include a support frame having a support surface extending from a leading end portion to a trailing end portion along a support frame plane. The support frame may include two tracks.

The cart may also include a pair of leading legs and a pair of trailing legs coupled to the support frame. The leading legs may extend along a leading leg plane, the leading legs pivotally coupled to the support frame at a pivot location closer to the leading end portion than the trailing end portion.

To fold the cart from a use position to a collapsed position for transport in a vehicle, a leading leg folding system may be provided including a means for releasing the leading legs from the use position to the collapsed position. The releasing means may include an actuator wheel such that when the cart is loaded into the vehicle and the means for releasing the leading legs engages the load entry surface, the actuator wheel is displaced opposite the direction of motion of the cart and upwards towards the support frame to release the leading legs from the use position to the collapsed position.

The present disclosure resolves problems with loading carts into vehicles. The present disclosure provides an ergonomic cart and a method of loading the cart that is easy to use and reduces strain on the user. In particular, the cart is supported by the vehicle during loading and, sufficiently before the release mechanism is released and the leading legs are collapsed. Features of the cart provide a reliable lock in the use position, and a reliable and smooth automatic unlocking and folding when the cart is loaded into a vehicle.

The details of one or more examples are set forth in the accompanying drawings and the description below. Other features, objects, and advantages will be apparent from the description and drawings, and from the claims.

BRIEF DESCRIPTION OF DRAWINGS

FIG. 1a is a side view of an illustrative embodiment of a foldable cart in a use position.

FIG. 1b is a front view of the cart of FIG. 1a.

FIG. 3 is a top perspective view of the cart of FIG. 1a.

FIG. 5 is a bottom perspective view of a portion of the cart of FIG. 1a.

FIG. 8a is a side view of an illustrative actuator bar of the cart of FIG. 1a.

FIG. 8b is a close-up side view of a portion of the actuator bar of FIG. 8a depicting the actuator slot.

FIG. 11 is a side view of an illustrative lock of the cart of FIG. 1a.

FIG. 12 is a rear perspective view depicting a portion of the cart of FIG. 1a.

FIG. 13 is a side perspective view depicting a portion of the cart of FIG. 1a.

FIG. 16 is flow chart depicting an illustrative method of loading the cart of FIG. 1a into a vehicle.

FIG. 17 is a flow chart depicting an illustrative method of unloading the cart of FIG. 1a out of a vehicle.

DETAILED DESCRIPTION

Figure 2:
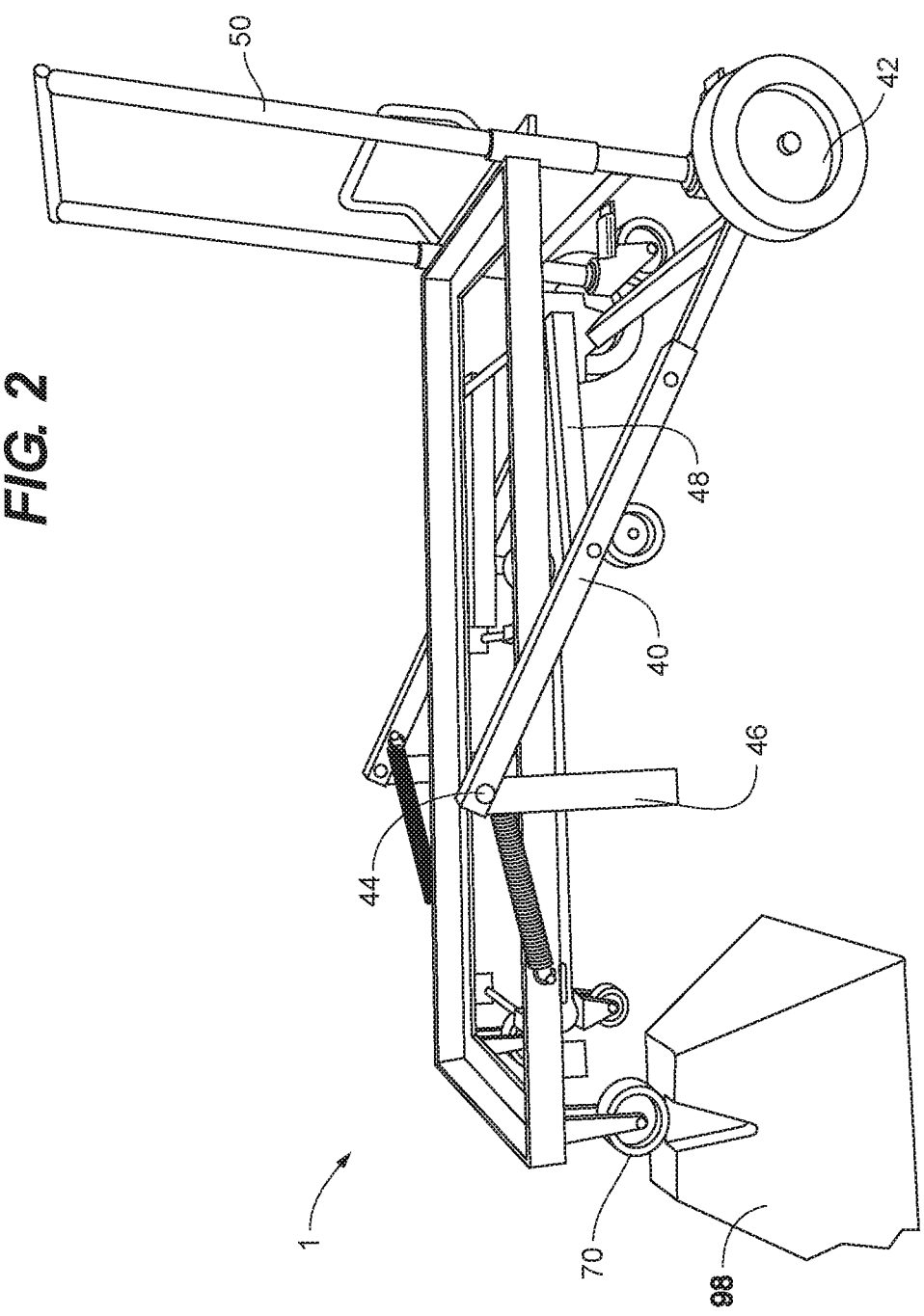
FIG. 2 is a side view of the cart of FIG. 1a in a collapsed position (e.g., depicted with front loading wheels resting on an optional funnel component).
Figure 3:
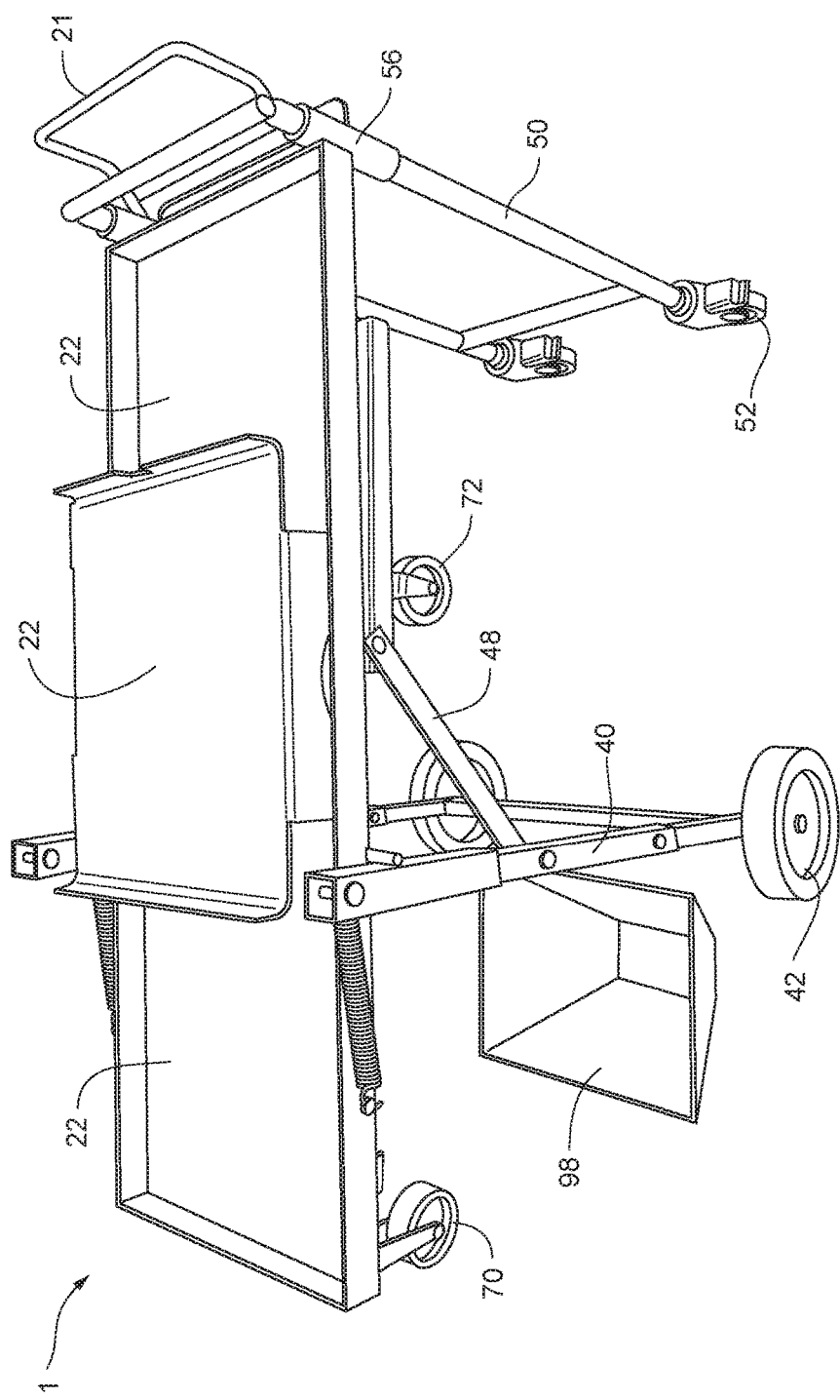

The following detailed description in exemplary in nature and is not intended to limit the scope, applicability or configuration of the disclosure in any way. Rather, the following description provides practical illustrations for implementing illustrative embodiments of the disclosure.

As used herein, the terms "about", substantially" etc. are intended to allow some leeway in mathematical exactness to account for tolerances that are acceptable in the trade and to prevent any unconscientious violator from unduly taking advantage of the disclosure in which exact or absolute numerical values are given to illustrate a particular embodiment and so as to help understand the invention.

The disclosure provides an advantageous foldable cart and method of folding a cart for loading the cart into a vehicle. Embodiments of the cart described herein may be used with a vehicle having a loading opening including a load entry surface.

Cart Overview

The folding cart may be provided with legs (e.g., wheeled legs), and may be constructed as shown with respect to the illustrative embodiment of FIGS. 1-15. The cart may be foldable from a use position to a collapsed position. Generally, the foldable cart 1 includes a handle 21, a support frame 20 extending along a support frame plane from a leading end portion 26 to a trailing end portion 28 having a support surface 22. The support frame plane defined along the xz plane in FIG. 1, where z is into the page. The support frame may further include rails 24, tracks 30, a pair of loading wheels 70 coupled to the leading end portion, a pair of leading legs 40, a pair of trailing legs 50, a release mechanism 60 to release the foldable cart 1 from a use position (FIG. 1a) to a collapsed position (FIG. 2), an actuation system 80 to initiate release of the release mechanism 60, and one or more leading leg supports that transfer motion of the release mechanism 60 to the leading legs 40 to collapse the leading legs 40. In some embodiments, the use position is defined as the leading legs 40 being arranged substantially perpendicular to the support frame 20. Substantially may be defined as substantially perpendicular within manufacturing and assembly tolerances or about ±10%. In some embodiments the collapsed position is defined as when the pair of leading legs 40 are arranged at an angle between 0-30 degrees to the support frame 20.

The benefit of the arrangement described herein is that problems with loading carts into vehicles are reduced. The present disclosure provides an ergonomic cart and a method of loading the cart that is easy to use and reduces strain on the user. Another benefit is that the cart is supported by the vehicle during loading into the vehicle. The support is provided sufficiently before the release mechanism 60 is released and the leading legs 40 are collapsed to prevent accidents during loading. Features of the cart provide a reliable lock 64 in the use position, and a reliable and smooth automatic unlocking and folding (e.g., release) when the cart 1 is loaded into a vehicle.

Support Frame

As shown in the illustrative embodiment of FIGS. 1-15, and perhaps most comprehensively in FIGS. 1a and 1b (e.g. in the use position), the foldable cart 1 includes the support frame 20 having a support surface 22 to support the weight of an item being carried. The support surface 22 may include a first surface that is arranged to face the items being carried and to support the items being carried. Opposite the first surface is a second surface. The support surface 22 may extend along a support frame 20 plane in a uniform or non-uniform manner and take on any suitable shape and form, including flat, uneven, discontinuous or irregular shapes. The support surface 22 may be a layer of sheet-like material such as diamond plate, but any suitable shape, texture or material may be used, including wire, mesh or grid-like material.

Rails and Tracks

In some embodiments, the support frame 20 may include a pair of rails 24 extending along the support frame 20 plane. The rails 24 may extend from the leading end portion 26 to the trailing end portion 28 of the cart 1. The rails 24 provide support to the support surface 22 and each rail may include the track 30 that will be described in further detail below.

In some embodiments, the rails 24 may be integrally formed into the support surface 22 such that the rails 24 are not individual components. The rails 24 may also be incorporated into or integrally formed into other components of the support frame 20.

The track 30 may be integrally formed as part of the rail or the rail could include multiple components that together form the track 30. If the track 30 is not integrally formed in the rail, the track 30 may be coupled to the rail either directly or indirectly. In the illustrative embodiment, both of the rails 24 include a track 30. However, in some embodiments, only one rail may include a track 30, or the track 30 could be incorporated into a component other than the rail.

The support frame 20 may include loading wheels to facilitate loading into a vehicle. As shown in FIG. 1a, front loading wheels 70 may be located near (e.g., at, proximate, adjacent) the leading end portion 26 of the support frame 20 or rails 24. During loading of the cart into the vehicle, the front loading wheels 70 may support at least a portion of the weight of the cart while the leading legs 40 are being folded. Mid loading wheels 72 may be located generally centrally along the support frame 20 in between the leading end portion 26 and the trailing end portion 28. In some embodiments, the loading wheels 70, 72 are provided solely for loading into a vehicle. In some embodiments, the loading wheels 70, 72 do not contribute to rolling of the cart when the cart is in the use position. In some embodiments the loading wheels 70, 72 do not form any part of the actuation system 80 for folding the leading legs 40 of the cart (to be described in further detail below).

Leading Legs

As perhaps best shown in the illustrative embodiment of FIG. 1a, a pair of leading legs 40 and a pair of trailing legs 50 may be coupled to the support frame 20. The leading legs 40 are pivotally coupled to the support frame 20 at a pivot location 44. The pivot location 44 may be located closer to the leading end portion 26 of the support frame 20 than the trailing end portion 28 of the support frame 20. The location of the pivot location 44 may result in the support frame 20 having a cantilevered portion 20a of the support frame 20 that is at least 25% of the length of the support frame 20.

The pair of leading legs 40 may be described as extending along a leading leg plane (e.g., a plane extending along the leading legs 40, such as plane xz of FIG. 1a, where z is into the page).

As shown in FIG. 1a, each of the leading legs 40 may reside in a leading leg housing 46 when the leading legs 40 are oriented in their use position. The leading leg housings 46 provides stability and restriction of movement to the leading legs 40 during use. One of the leading leg housings 46 is also shown in FIG. 2 which depicts the collapsed position of the cart 1. In the collapsed position of the cart, the leading legs 40 pivot out of the leading leg housings 46. In some embodiments, and as shown in the illustrative embodiment, the pivot location 44 is located on the leading leg housing 46. In other embodiments, the pivot location 44 may be located or integrated into another suitable component of the support frame 20, or an extension of the support frame 20.

Leading Leg Folding System Overview

Figure 4:
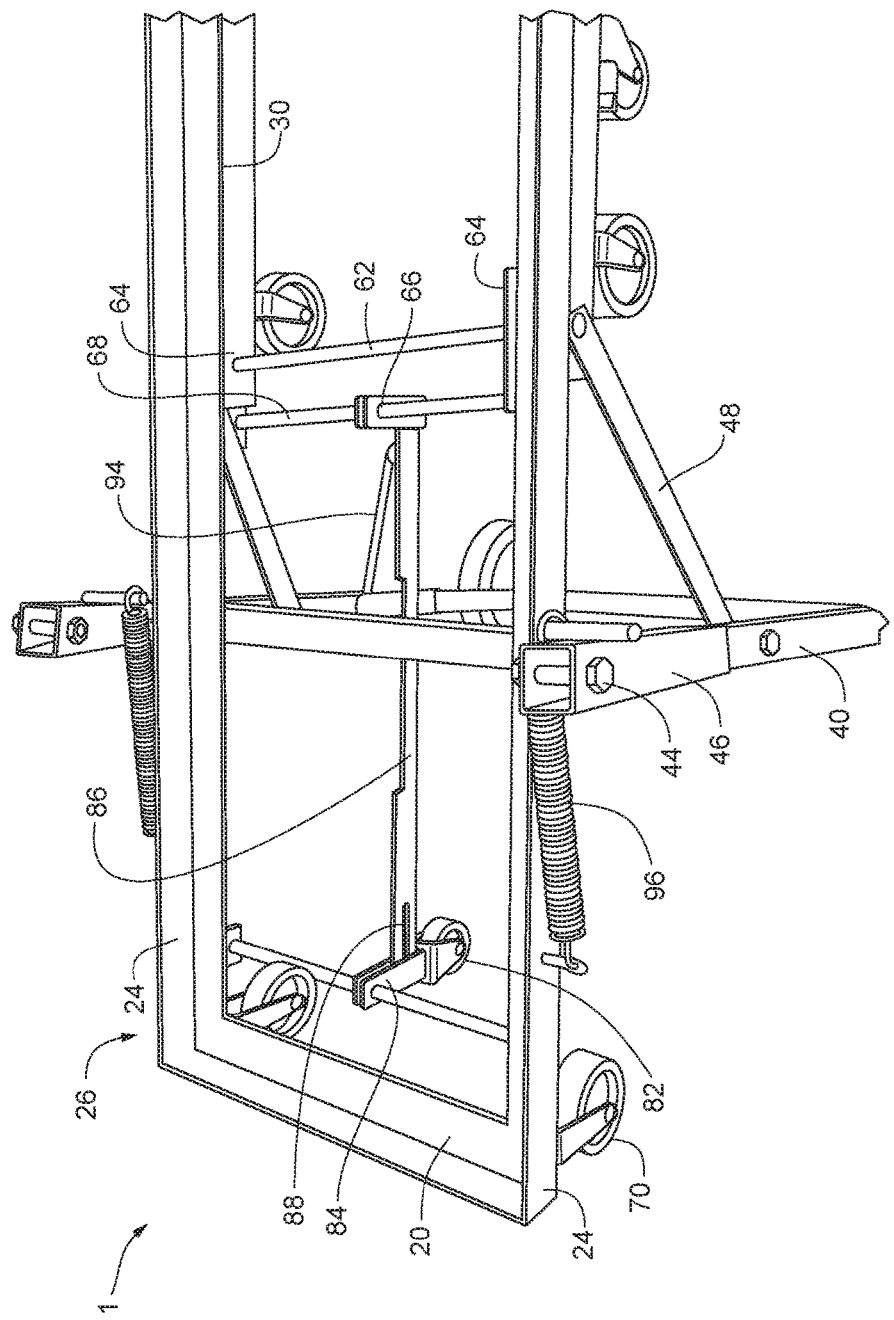
FIG. 4 is a top perspective view of a portion of the cart of FIG. 1a with the support surface removed to show an actuation system and release mechanism.
Figure 5:
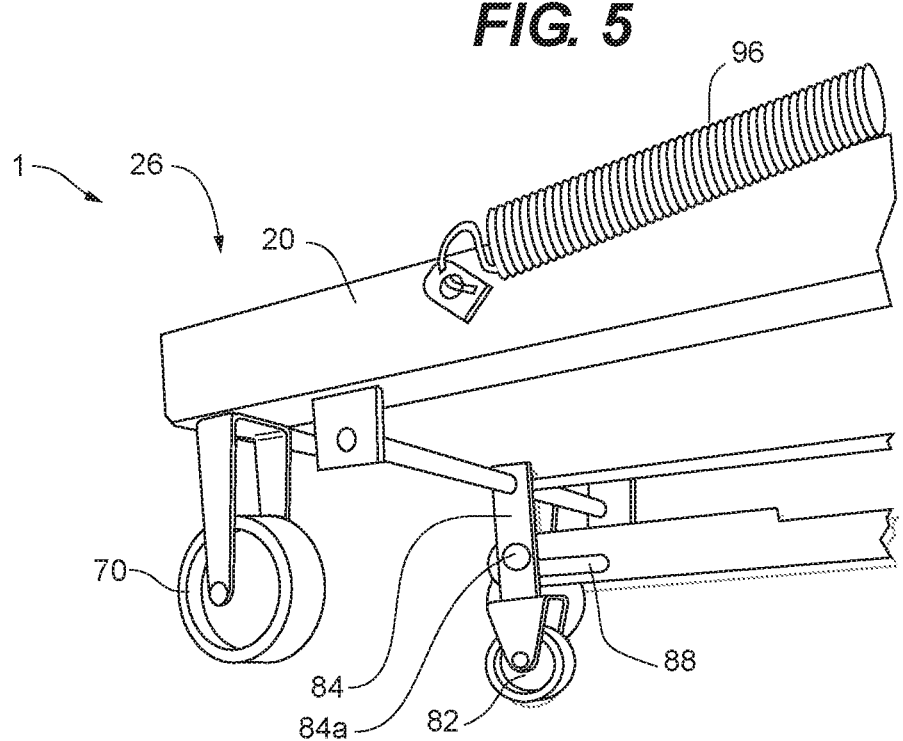

As shown in FIG. 4, a leading leg folding system is provided so that the cart 1 may be reduced in size (e.g., re-configured) for loading into a vehicle. The leading leg folding system allows the leading legs 40 of the cart to be released from a use position (e.g., FIG. 1a) to a collapsed position (e.g., FIG. 2). With reference to the overall system as shown in FIG. 4, the leading leg folding system is a combination of a release mechanism 60 (e.g., FIGS. 4 and 9-11), one or more leading leg supports 48 (e.g., FIGS. 1a, 1b, 2-4 and 10) that are coupled between the release mechanism 60 and each of the leading legs 40, and an actuation system 80 (e.g., FIGS. 4-8).

In a general overview, when the actuation system 80 is actuated, the release mechanism 60 is released. When the release mechanism 60 is released, the leading leg supports 48 transfer the motion of the release mechanism 60 to the leading legs 40 and the leading legs 40 may fold from the use position to the collapsed position.

Release Mechanism

Figure 9:
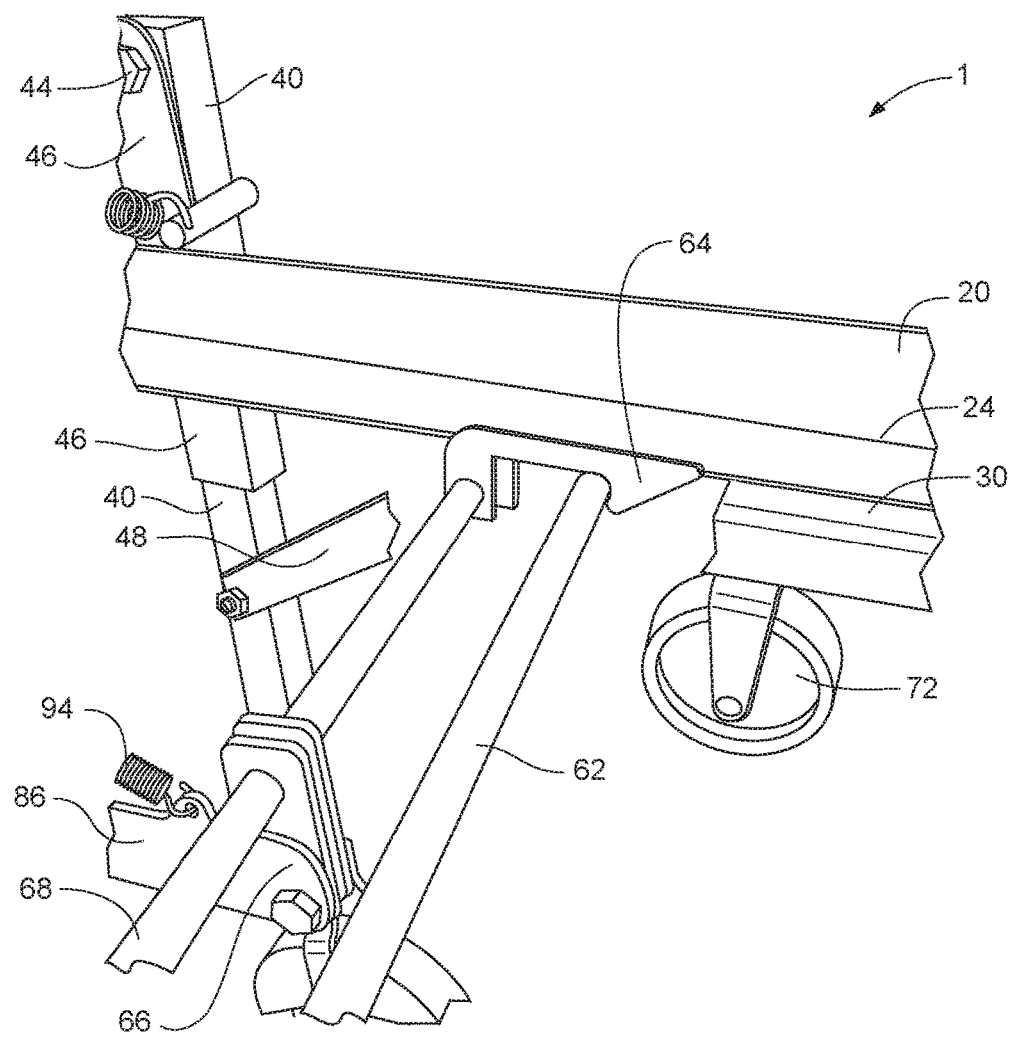
FIG. 9 is a top perspective view of a portion of an illustrative embodiment of a release mechanism of the cart of FIG. 1a in the locked position (in a use position of the cart).
Figure 10:
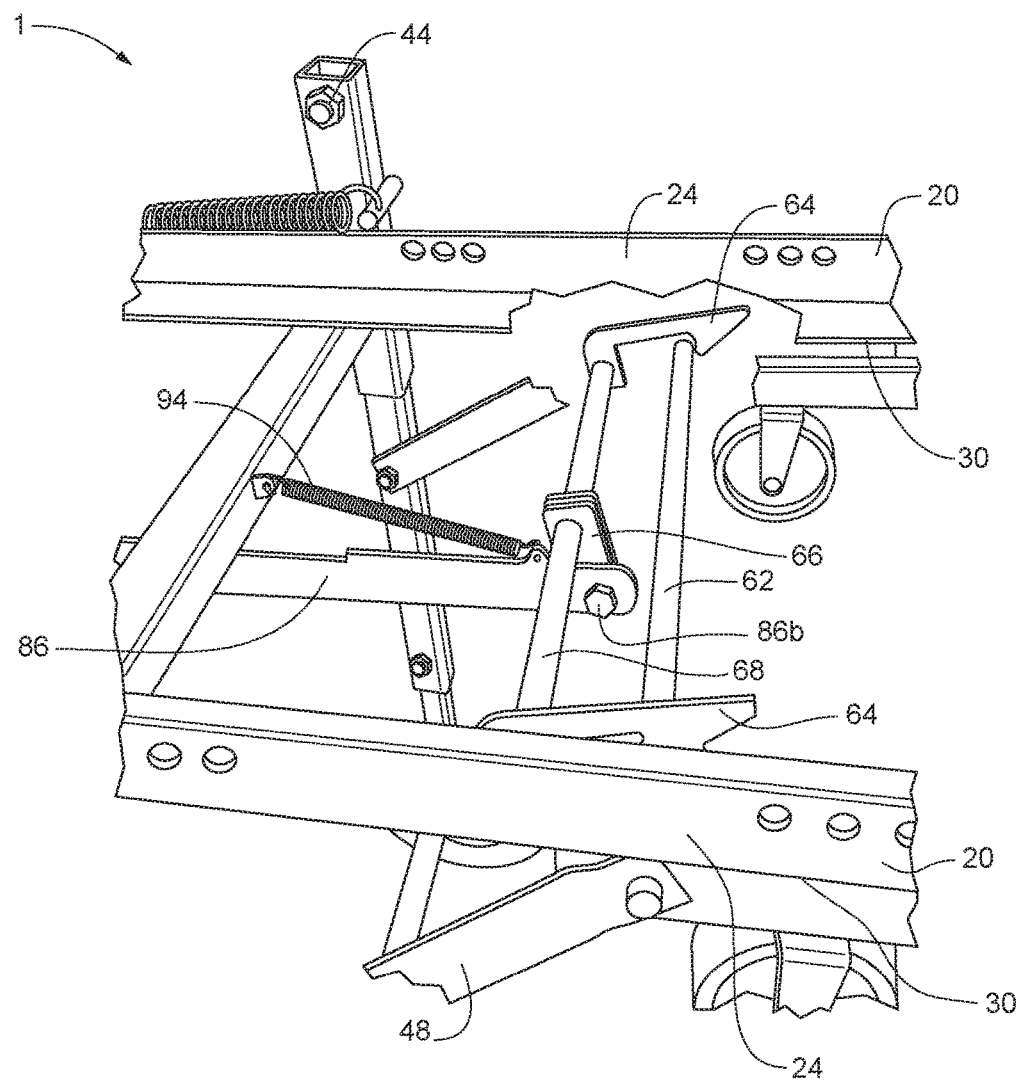
FIG. 10 is a top perspective view of the release mechanism of the cart of FIG. 1a in the unlocked position.
Figure 11:
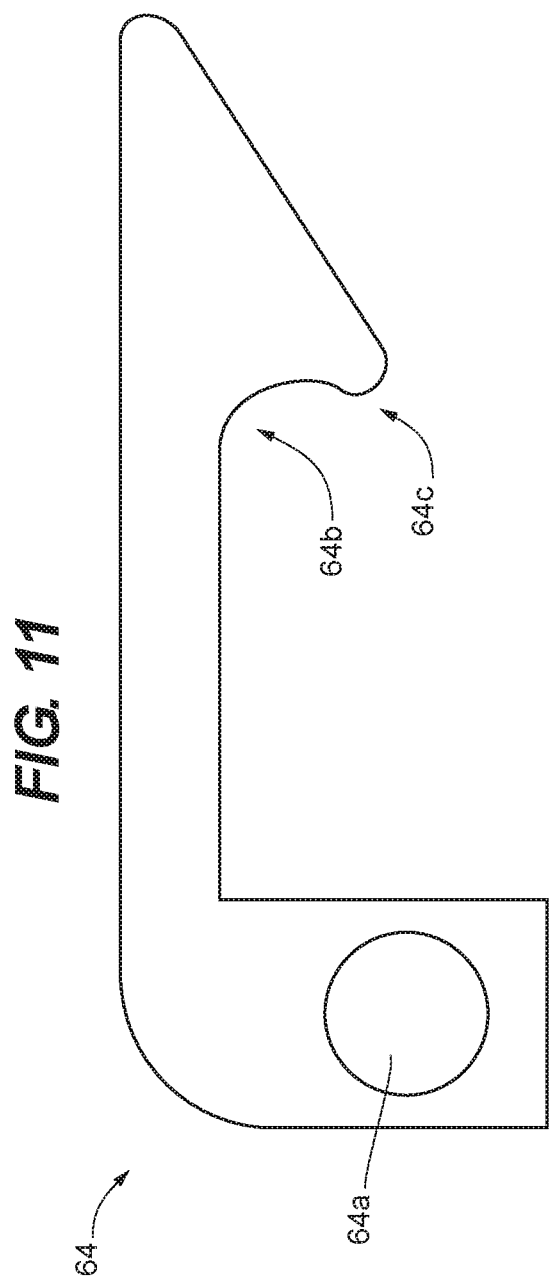

As shown in FIGS. 9-11, and perhaps best shown in FIG. 10, the release mechanism 60 may include: a slideable track bar 62 and one or more locks 64. When the lock(s) 64 are engaged with the track bar 62, the track bar 62 is locked in place and cannot slide along the track 30. In the illustrative embodiment, the track bar 62 extends from the track 30 of one rail 24 to the track 30 of the other rail 24 When the locks are released, the track bar 62 is slideable in the tracks 30 along the support frame 20.

Leading Leg Supports

To transfer this sliding motion from the track bar 62 to the leading legs 40, the leading leg supports 48 are provided. In the illustrative embodiment, each leading leg 40 is provided with a respective leading leg support 48. As best shown in FIGS. 1a and 2, each of the leading leg supports 48 are pivotably coupled to a respective one of the leading legs 40. As best shown in FIG. 10, the leading leg supports 48 also extend to and are coupled to the track bar 62. This arrangement of the leading leg supports 48 transfers the motion of the track bar 62 to the leading legs 40. In the illustrative embodiment and other embodiments, the leading leg support 48, the leading legs 40, and the track bar 62 may be arranged to convert the sliding movement of the track bar 62 into pivoting motion of the leading legs 40.

Because the leading leg supports 48 are coupled to both the track bar 62 and the leading legs 40, when the locks are engaged with the track bar 62, the leading legs 40 remain locked in their in use position (FIG. 1). In contrast, when the locks are released, the track bar 62 is released and the leading leg supports 48 transfer the sliding movement of the track bar 62 to the leading legs 40 (FIG. 2). In other words, when the locks are released from the track bar 62, the arrangement of the leading leg supports convert the sliding movement of the track bar 62 into pivoting motion of the leading legs 40, allowing the leading legs 40 to fold to the collapsed position.

Actuation System

The actuation system 80 of the leg folding system is best shown in FIGS. 4, 5, 6, 7, 8a and 8b. The actuation system 80 serves to initiate (e.g., trigger, actuate) automatic release of the release mechanism 60 when the cart 1 is loaded into a corresponding vehicle. When the cart is loaded into the corresponding vehicle, the cart interfaces with a load entry surface 3 of the corresponding vehicle, which may include a ramp and/or a plate. In the illustrative embodiment, the actuation system 80 is initiated by an actuator wheel 82 that interfaces with the load entry surface 3. The actuator wheel 82 may be located along the support frame 20 in between the leading end portion 26 and the pivot location 44.

Figure 7:
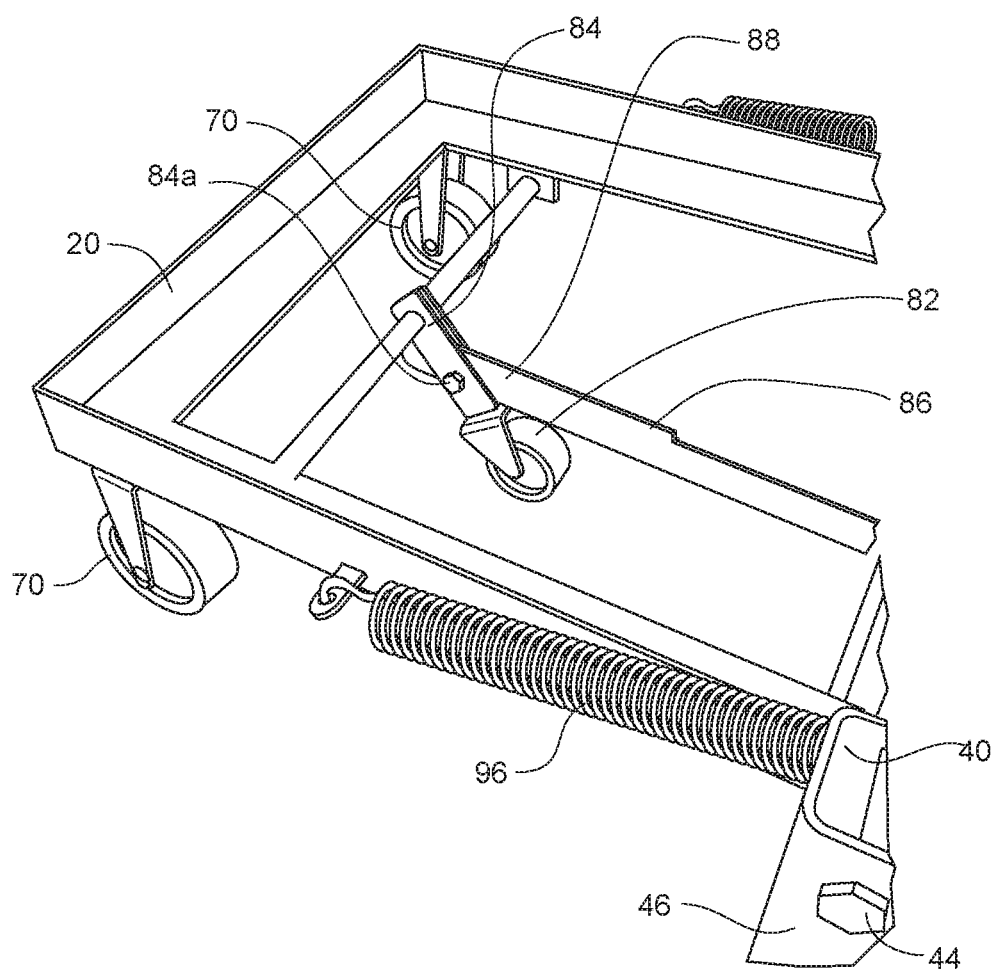
FIG. 7 is a top perspective view of a portion of the cart of FIG. 1a with the support surface removed and the actuator wheel engaged.

In some embodiments, and as perhaps best illustrated with reference to FIG. 14, the distance between a leading edge of the front loading wheel 70 and a leading edge of the actuator wheel 82 may be important. In some cases this dimension is critically important. For example, in some embodiments, when the cart is in the use position and the actuator wheel 82 is at rest, the actuator wheel 82 is located such that the distance along the x-direction from a leading end of the front loading wheel 70 to a leading end of the actuator wheel 82 (depicted as X1 in FIG. 14) is preferably about 3½ inches, such as between 3¼ inches and 3¾ inches. In addition, when the cart 1 is being loaded into a vehicle and the actuator wheel 82 is displaced as shown in FIG. 7, the actuator wheel 82 travels horizontally such that the distance X1 becomes about 5⅜ inches, such as between 5⅛ inches and 5⅝ inches. In other words, from the rest position of the actuator wheel 82 to the point where the actuator wheel 82 impacts the actuator bar 86 (displaced position), the actuator wheel 82 moves between 1⅝ to 2⅛ inches along the x-axis before releasing and resetting.

In some embodiments, it is critical that the dimension X1, described above, increases from 3.5 inches to 5⅜ inches (a change of 1⅞ inches). This assumes standard manufacturing tolerances.

In some embodiments, the lock 64 will not clear the track bar 62 until the actuator wheel 82 travels 1½ inches, leaving the leading legs 40 a small ⅜ inch window to impact the vehicle load entry surface 3 (e.g., vehicle step side, FIG. 6) and disengage for system to work correctly. In some embodiments, it is preferable that the track bar 62 be disengaged between 1 9/16 inches to 1 13/16 inches.

Other embodiments, including other preferred embodiments, may include dimensions outside these ranges, such as for accommodating different vehicles having different load entry surfaces 3 (e.g., plates, ramps, etc.).

FIG. 4 depicts a top perspective view of a portion of the cart with the support surface 22 removed. The support surface 22 is removed to show details of the actuation system 80 and release mechanism 60. The illustrative actuation system 80 includes: a pivotable wheel mount 84, an actuator wheel 82, a displaceable actuator bar 86 having an actuation slot 88, a lock mount 66, and a lock bar 68 that is coupled to the locks 64 of the release mechanism 60 (previously described with respect to FIGS. 9-11). In general, the actuation system 80, including the actuator wheel 82, may be centrally located between the rails 24.

Wheel Mount and Actuator Wheel

As shown in FIG. 4, the wheel mount 84 is coupled to the support frame 20. The wheel mount 84 provides a mounting means for mounting the actuator wheel 82 to the support frame 20. In the illustrative embodiment, the wheel mount 84 is pivotably coupled to the support frame 20 at one end and the actuator wheel 82 is coupled to a free end portion of the wheel mount 84. The free end portion being opposite the coupling of the wheel mount 84 to the support frame 20. This arrangement provides movement of the actuator wheel 82 with respect to the support frame 20 to trigger release of the release mechanism 60.

In the illustrative embodiment and in other embodiments, the wheel mount 84 extends away from the leading end portion 26 at an angle to the support frame 20 plane. For example, as shown in FIG. 4, the wheel mount 84 may extend away from the support frame 20 plane at an angle $\alpha$ that is less than 90 degrees. The angle $\alpha$ may be defined as the angle between the support frame 20 plane and an axis of the wheel mount 84b, wherein the angle $\alpha$ is the angle on the rearward side of the wheel mount 84 (e.g., the angle facing away from the leading end portion 26 of the support frame 20). In some embodiments, the angle $\alpha$ is about 83 degrees in the rest position of FIG. 6. When displaced by the load entry surface of a vehicle (e.g., FIG. 7), the actuator wheel will travel about 18-28 degrees such that the angle $\alpha$ is reduced to between 65 to 55 degrees before the lock is released and reset. In a preferred embodiment, the angle $\alpha$ is less than 85 degrees in the rest position (FIG. 6) and decreases to a minimum of 50 degrees when the actuator wheel 82 is fully actuated (variation may include standard manufacturing tolerances). In a preferred embodiment the actuator wheel moves such that the angle $\alpha$ in changeable between 86 degrees and 52 degrees. In a more preferred embodiment, the angle $\alpha$ is changeable between 83 degrees and 55 degrees (e.g., between about 83 degrees and about 55 degrees, variation may include standard manufacturing tolerances). This design provides beneficial locking and unlocking.

The wheel mount 84 may also be coupled to the displaceable actuator bar 86. A detailed view of the actuator bar 86 is shown in FIGS. 8a and 8b. In some embodiments, the actuator bar 86 is coupled to the wheel mount 84 at a location along the wheel mount 84 axis that is in between the coupling to the support frame 20 (or another intermediate component such as a wheel mount 84 bar), and the actuator wheel 82. The actuator bar 86 provides a means for transferring motion of the actuator wheel 82 to the release mechanism 60. The actuator bar 86 may extend from a first end portion 86a to a second end portion 86b.

Actuation Slot

An actuation slot 88 is disposed in the actuator bar 86, generally located in (e.g., disposed in, at, near, or proximate) the first end portion 86a of the actuator bar 86. The actuation slot 88 provides a slideable coupling relationship between the actuator bar 86 and the wheel mount 84. For example, the wheel mount 84 may be slideably coupled to the actuation slot 88 in a manner that, when the actuator wheel 82 is actuated, relative motion of the actuator wheel 82 with respect to both the support frame 20 and with respect to the actuator bar 86 is facilitated. This relative motion is best shown in a comparison of FIG. 4 and FIG. 7. In some embodiments the wheel mount 84 is coupled to the actuator bar 86 by a through bolt 84a of the wheel mount 84 extending through the actuation slot 88 of the actuator bar 86.

FIG. 8b provides a close-up view of an illustrative and preferred embodiment of the actuation slot 88. In some embodiments, the actuation slot 88 is curved. In some embodiments, the actuation slot 88 is curved into an L-shape as shown in FIG. 8b. The actuation slot 88 shape provides beneficial movement of the actuator wheel 82 when actuated, allowing the actuator wheel 82 to transfer motion to the actuator bar 86. The actuation slot 88 shape of FIG. 8b also provides for desirable motion of the actuator wheel 82 not only opposite the direction of motion of the cart but also upward movement of the actuator wheel 82 to facilitate release of the release mechanism 60. This movement of the actuator wheel 82 ensures that the actuator wheel 82 not only transfers force to disengage the lock 64, but also beneficially moves the actuator wheel 82 up and out of the way during loading. If the actuator wheel 82 does not move out of the way when loading, the actuator wheel 82 may awkwardly carry some of the load of the cart 1 and may become bent and damaged under the weight of the cart 1 and items on the cart 1. The movement of the actuator wheel 82 allows the front loading wheels 70 to properly carry the majority of the load of the cart.

In some embodiments, and as shown in FIG. 8b, the actuation slot 88 shape may be described as having a vertical portion 88a (e.g., along the y-axis in FIG. 1), and a horizontal portion 88b (e.g., along the x-axis in FIG. 1), a radius portion 88c and an angled portion 88d. The angled portion 88d extending from the radius portion 88c at the intersection of the vertical and horizontal portions 88a, 88b. This arrangement of the actuation slot 88, including radius 88c, holds the through bolt 84a in place until a certain amount of movement forces it out of the vertical portion 88a and into the horizontal portion 88b. A benefit of this design is that it provides the proper movement, timing and order of disengagement events to take place to facilitate the folding operation of the cart 1.

Lock Mount, Lock Bar and Locks

As shown in FIGS. 4, 9 and 10, the second end portion 86b of the actuator bar 86 includes a coupling that transfers the motion of the actuator wheel 82, via the actuator bar 86, to the locks 64 to release the locks 64. To transfer the motion of the actuator wheel 82 to the locks 64, the second end portion 86b of the actuator bar 86 may be pivotably coupled to a lock bar mount 66 that is fixedly coupled to the locks 64 of the release mechanism 60 via an intermediate lock bar 68. In some embodiments only one of the locks 64 shown may be provided.

Figure 6:
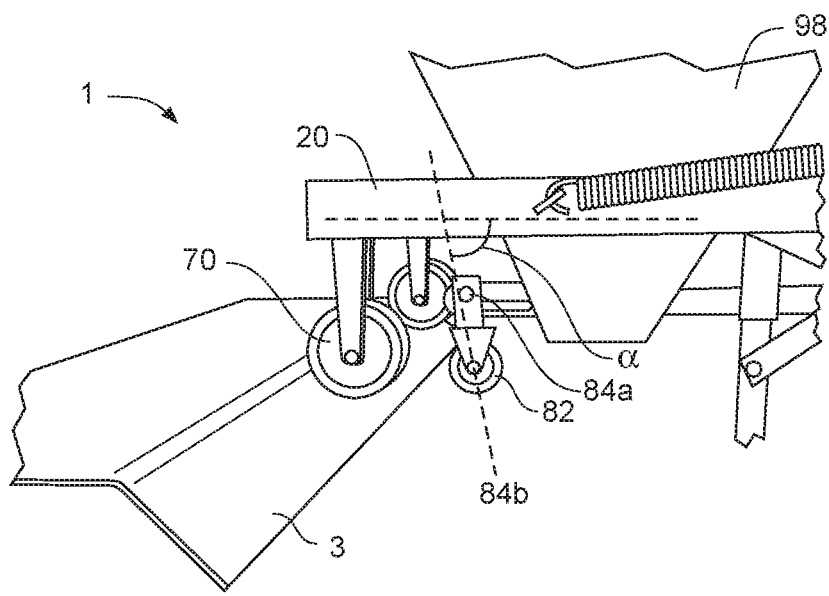
FIG. 6 is a side view of a portion of the cart of FIG. 1a in relation to an illustrative load entry surface of a vehicle.

As perhaps best shown in FIGS. 6 and 7, when the cart 1 is loaded into the vehicle and the actuator wheel 82 engages with the load entry surface 3 of the vehicle, the actuator wheel 82 is actuated and displaced opposite the direction of motion of the cart. As perhaps best shown in FIGS. 9 and 10, when the actuator wheel 82 is displaced opposite the direction of motion of the cart, the arrangement of the actuation system 80 transfers motion to the release mechanism 60 components causing rotation of the lock bar 68. Rotation of the lock bar 68 thereby releases the locks 64 from the track bar 62 (FIG. 10). FIG. 11 depicts a close up view of one of the locks 64. As shown in FIG. 11, the lock 64 is configured for coupling to the lock bar 68 at coupling joint 64a, and the engaging portion of the lock 64 includes a radius 64b to grip around the track bar 62. In a preferred embodiment the engaging portion transitions into an opposing radius 64c to allow smooth release of the lock 64 on the track bar 62.

Actuation of the actuation system 80 described above causes the locks 64 to be released from the track bar 62, and the thus the track bar 62 is allowed to slide in the tracks opposite the direction of motion of the cart causing the leading legs 40 to pivot from the use position to the collapsed position.

Resistance Members (e.g., Springs)

As shown in FIG. 4, the cart 1 may include resistance members (e.g., springs, elastic bands, dampers, etc.) that provide smooth operation of the cart from the use position to the collapsed position and also a smooth return of the cart from the collapsed position to the use position. For example, in some embodiments, a first resistance member 94 may be coupled to the support frame 20 and to the actuator bar 86 to cause the actuator bar 86, and hence also the locks, to return to, or default to, the locked position when the actuator wheel 82 is not being actuated. For example, the first resistance member 94 helps to return the actuator bar 86 and locks back to the locked or use position. Such as during unloading when the actuator wheel 82 is dis-engaged with the vehicle's load entry surface 3 and the force that is holding the legs in a folded position is removed.

A second resistance member 96 may be coupled to the leading legs 40 and to the support frame 20 to also help the leading legs 40 return to or default to the use position. The second resistance member 96 may be coupled to the support frame 20 at a location between the leading end portion 26 and the leading legs 40. Like the first resistance member 94, the second resistance member 96 helps the leading legs 40 return to their in use position when the force that is holding the leading legs 40 in a folded position is removed, such as during unloading. The examples of mounting locations and components provided for the first and second resistance members 94, 96 are only exemplary in nature. The first and second resistance members may be coupled to any other suitable location or other components that cause the locks to return to the locked position and the leading legs 40 to return to their use position. Any arrangement of first or second resistance members that provides the same functions is considered to be within the scope.

Trailing Legs

Figure 12:
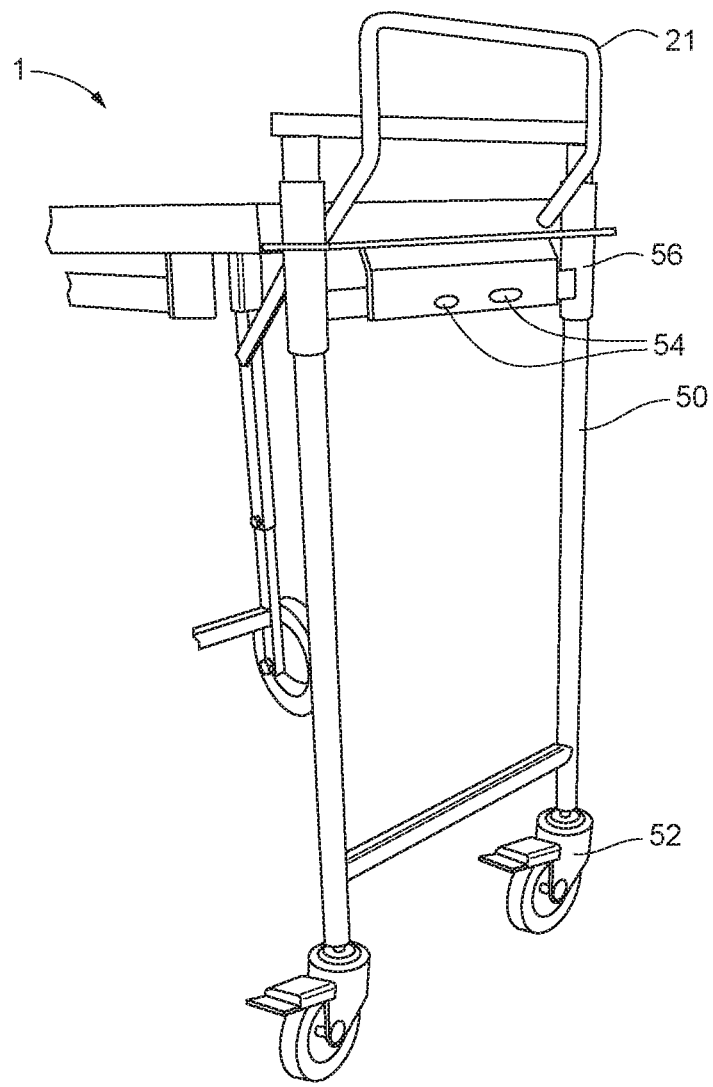
Figure 13:
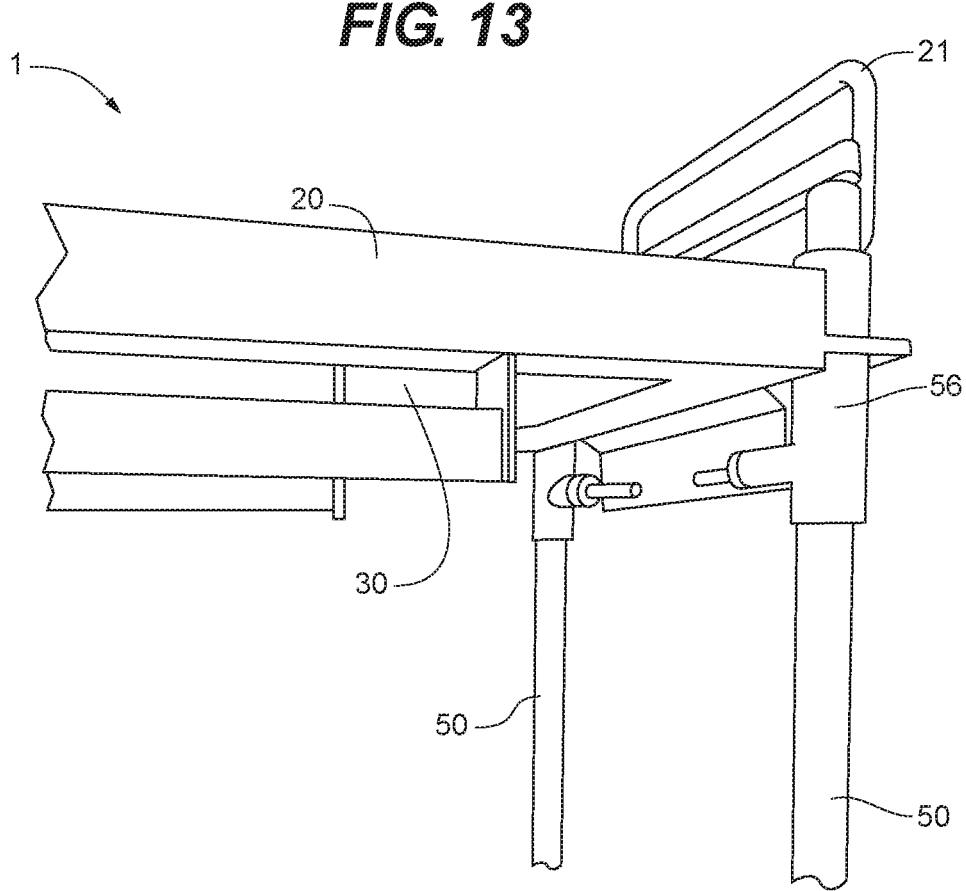

As best shown in FIGS. 12 and 13, the trailing legs 50 may be located at the trailing end portion 28 of the support frame 20. A handle 21 for operating the cart may be located near the trailing legs 50. In the illustrative embodiment, the trailing legs 50 may be slideable along a trailing leg plane that is generally perpendicular to the support frame 20 plane. The trailing leg plane may be a plane along the xz axis in FIG. 1, where z is into the page. In some embodiments, slide mounts 56 are provided to facilitate the sliding motion of the trailing legs 50. In the illustrative embodiment of the slide mounts 56, the slide mounts 56 are provided as a hollow tube that is slightly larger than the tube forming the trailing legs 50 so that the trailing legs 50 are slideable within the tube of the slide mounts 56. The illustrative slide mounts 56 are exemplary in nature, any suitable method 200 of slide mounting the trailing legs 50 is considered to be within the scope of the disclosure.

In the illustrative embodiment, the trailing legs 50 include a trailing leg release 54. When the trailing leg release is released, the trailing legs 50 are allowed to slide upward when a force to lift the trailing legs 50 is applied to the trailing legs 50. The trailing leg release may include one or more spring loaded pins. Such as two spring loaded pins that may be squeezed together to release the legs, as shown in FIG. 12. However, any suitable mechanism known in the art may be used to release the trailing legs 50. The sliding motion of the trailing legs 50 upon release is beneficial, for example, when loading and unloading the cart into the vehicle.

Funnel

Figure 14:
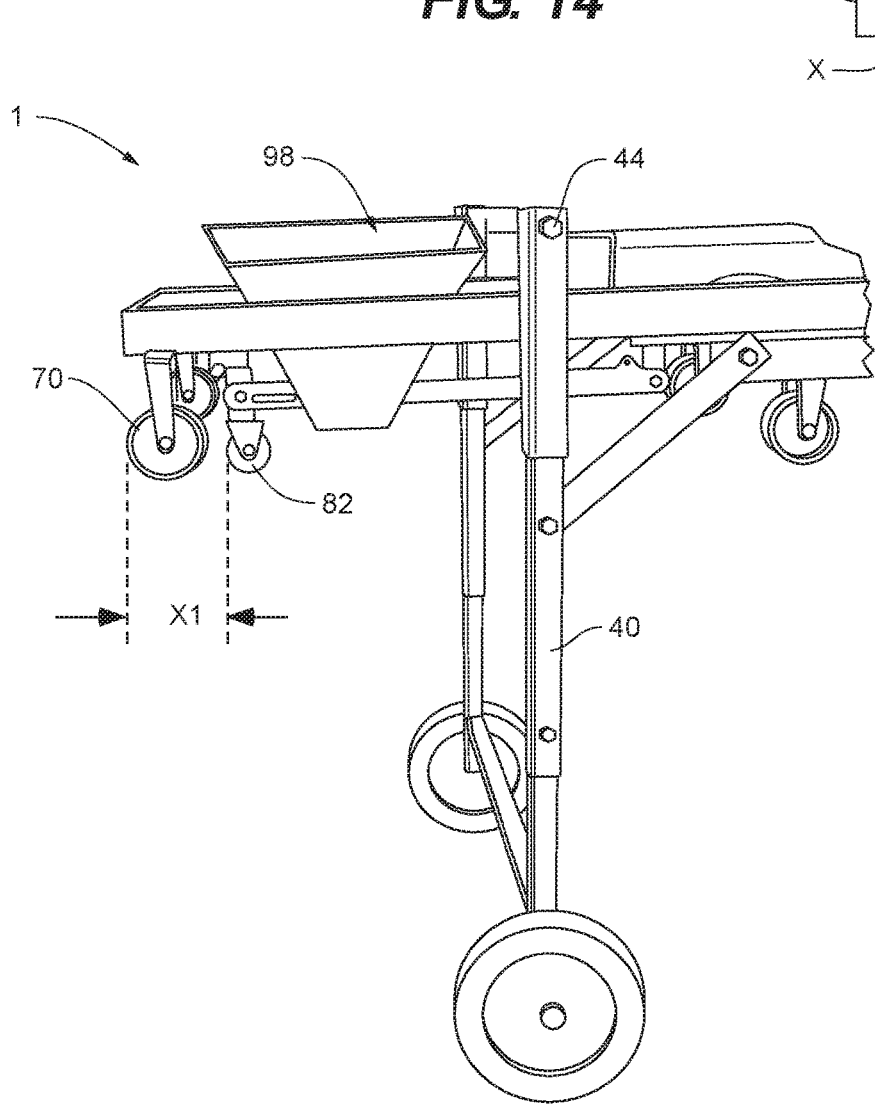
FIG. 14 is a side view of the cart of FIG. 1a including a funnel feature.
Figure 15:
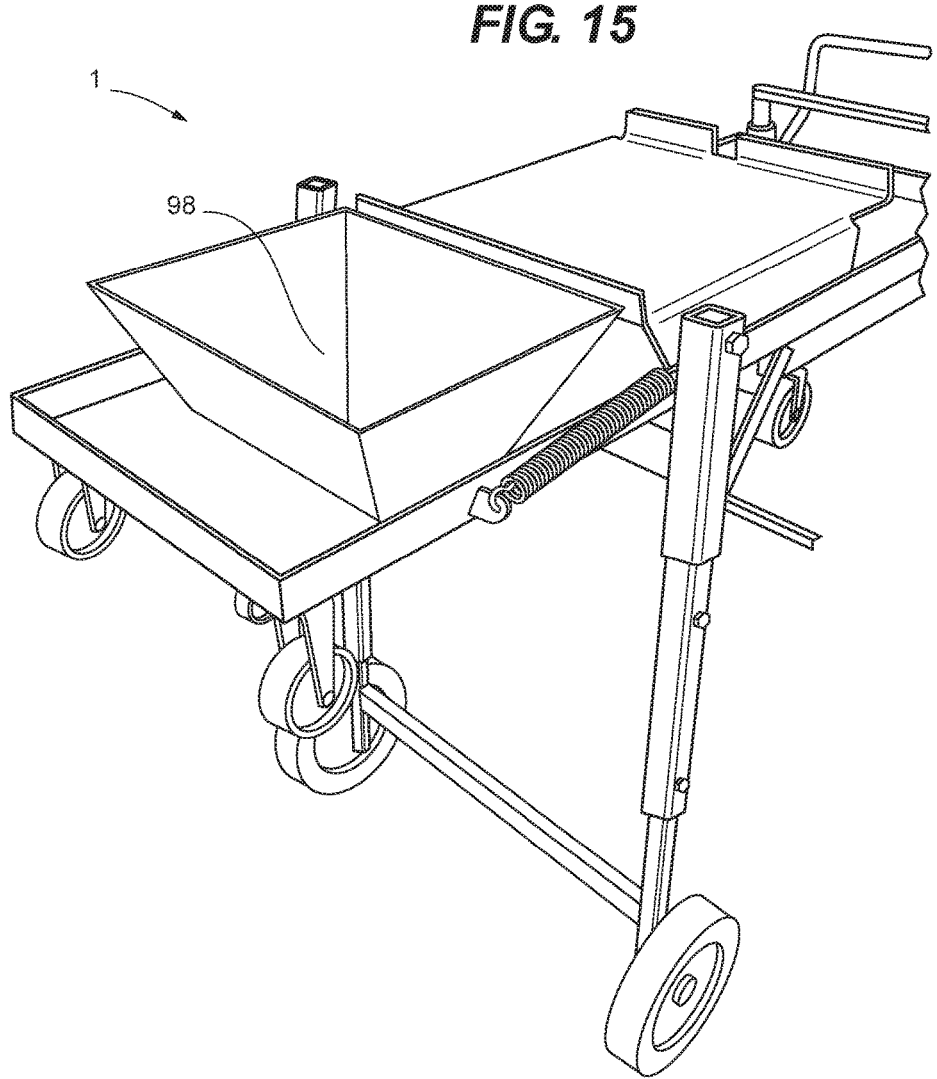
FIG. 15 is a perspective view of the cart of FIG. 1a including a funnel feature.

In some embodiments, and as shown in FIGS. 6, 13 and 14, an optional funnel 98 is shown. If the funnel 98 is to be used, a portion of the support surface 22 may be removed and the funnel 98 installed in place of the support surface 22. The funnel 98 may allow for easy transporting and delivery of freeform materials such as oil and other fluids, concrete mix, dirt, fertilizer, or any other suitable material that is dispensable via a funnel.

The Method

In an illustrative method 200 of loading a foldable cart 1 into a vehicle having a loading opening including a load entry surface 3, the method 200 may include providing a foldable cart 1 such as the illustrative cart described above. Other embodiments and variations of the foldable cart 1 may also be used with the illustrative method 200. Conversely, other embodiments and variations of the method 200 may also be used with the illustrative cart.

Steps of the method 200 of loading a foldable cart 1 into the vehicle include pushing the cart into the vehicle (Step 210). Pushing the cart into the vehicle may include supporting at least a portion of the weight of the cart on the front loading wheels 70 of the cart before collapsing (e.g., folding, pivoting) of the leading legs 40 occurs (Step 220). Pushing the cart forward may involve the leading legs 40 of the cart being lifted slightly off the ground, particularly if the load entry surface 3 includes a ramp.

Step 230 may include engaging the actuator wheel 82 with the load entry surface 3 to actuate the actuator wheel 82 and Step 240 includes displacing the actuator wheel 82 opposite the direction of motion of the cart. In some embodiments, the actuator wheel 82 may also be displaced upward and closer to the second surface. Displacing the actuator wheel 82 the actuator bar 86 opposite the direction of motion of the cart thereby causes rotation of the lock bar 68 and releasing of the locks from the track bar 62. Releasing the locks 64 from the track bar 62 allows the track bar 62 to slide in the tracks 30 in the direction opposite the direction of motion of the cart and pivoting the leading legs 40 from the use position to the collapsed position (Step 250). The pivoting action of the leading legs 40 may be facilitated by the vehicle pushing on the leading legs 40.

Some embodiments of the method 200 may include releasing the trailing leg release 54 (Step 260) and lifting the trailing legs 50 (Step 270) before pushing the cart completely into the vehicle (Step 280). In some embodiments, the method 200 may include other steps before pushing the cart completely into the vehicle. Alternatively, in some embodiments the cart may not be pushed completely into the vehicle or a portion of the cart may remain exposed to the environment external to the vehicle. In some embodiments, the methods described herein may be applied only to the leading legs 40 or only to the trailing legs 50.

In some embodiments, the operation and loading motion may be described as follows. Begin pushing the cart 1 into the vehicle such that the front loading wheels 70 begin to support the cart and the actuator wheel 82 engages with the vehicle to unlock the locks 64. When the locks 64 approach an upper limit and are almost unlocked the leading legs 40 push the leading leg support 48 which pushes the track bar 62 away from the open locks 64. As the cart continues forward, the upper limit of the actuator wheel 82 pushes the actuator bar 86 upward disengaging the bar from the actuator wheel 82, and the first resistance member 94 pulls the actuator bar 86 back to its original position in turn closing the locks. As the cart 1 continues forward, the leading legs 40 are pushed (e.g., pivoted) upward sliding the track bar 62 rearward toward the trailing legs 50. As the cart moves and the leading legs 40 continue to fold upward, the mid loading wheels 72 are pushed onto the load entry surface 3 (e.g., ramp). This action takes the remaining cart load off of the trailing legs 50 and the full load of the cart is now carried by the vehicle. Continue to push the cart forward until the trailing legs 50 are almost within the vehicle. Operate the trailing release 54 (e.g., squeeze the spring loaded pins) and lift the trailing legs 50 upward. Release the trailing release 54 to lock 64 the trailing legs 50 in the up position and push the cart the remaining distance into the vehicle.

As shown in FIG. 17, in a corresponding method 300 of unloading the cart 1 from a vehicle, the method 200 may include pulling the cart by the handle 21 until the trailing legs 50 are a few inches outside the loading opening of the vehicle (Step 310). Releasing the trailing release 54 until the trailing legs 50 drop and lock 64 into place (Step 320). Continue pulling the cart out of the vehicle until the folding legs automatically drop and fall into place until the track bar 62 engages with the locks (Step 330). Continue pulling the cart out of the vehicle until loading wheels roll off of the load entry surface 3 and the entire cart is removed from the vehicle (Step 340).

The present disclosure resolves problems with loading carts into vehicles. The present disclosure provides an ergonomic cart and a method 200 of loading the cart that is easy to use and reduces strain on the user. In particular, the cart is supported by the vehicle during loading and, sufficiently before the release mechanism 60 is released and the leading legs 40 are collapsed. Features of the cart provide a reliable lock 64 in the use position, and a reliable and smooth automatic unlocking and folding when the cart is loaded into a vehicle.

Illustrative embodiments have been set forth, and reference has been made to some possible variations. These and other variations and modifications of the invention will be apparent to those skilled in the art without departing from the scope of the invention, and it should be understood that this invention is not limited to the illustrative embodiments set forth herein. Features of any of the embodiments described herein may be interchanged, combined, added, or absent to create additional embodiments without departing from the scope of this disclosure. Various embodiments have been described, and these and others are within the scope of the following claims.

The invention claimed is:

1. A foldable cart for loading in a vehicle, the vehicle having a loading opening including a load entry surface, the cart comprising:
   a support frame having a support surface extending from a leading end portion to a trailing end portion along a support frame plane, the support frame including two tracks;
   a pair of leading legs extending along a leading leg plane, the leading legs pivotally coupled to the support frame at a pivot location closer to the leading end portion than the trailing end portion;
   a pair of trailing legs coupled to the support frame;
   a leading leg folding system comprising:
      a release mechanism to release the leading legs from a use position to a collapsed position, the release mechanism comprising:
         a track bar extending from one of the two tracks to the other of the two tracks and slideable therein;
         a lock that when engaged with the track bar is configured to maintain the cart in the use position;
         a leading leg support for transferring motion of the track bar to the leading leg, the leading leg support pivotably coupled to one of the leading legs and extending to and coupled to the track bar;
      an actuation system to initiate release of the release mechanism, the actuation system comprising:
         a wheel mount pivotably coupled to the support frame and having a free end portion;
         an actuator wheel coupled to the free end portion of the wheel mount, the actuator wheel located along the support frame in between the leading end portion and the pivot location;
         a displaceable actuator bar extending from a first end portion to a second end portion;
         an actuation slot disposed in the actuator bar first end portion, the wheel mount slideably coupled to the actuation slot;
         wherein the lock is coupled to the second end portion of the actuator bar;
         wherein when the cart is loaded into the vehicle and the actuator wheel engages the load entry surface, the actuator wheel is actuated and displaced opposite the direction of motion of the cart, and
         displacing the actuator bar opposite the direction of motion of the cart, causes the lock to be released from the track bar,
         wherein releasing the lock from the track bar allows the track bar to slide in the tracks opposite the direction of motion of the cart and the leading legs to pivot from the use position to the collapsed position.

2. The cart of claim 1, wherein the actuation slot is curved.

3. The cart of claim 1, wherein the actuation slot is L-shaped.

4. The cart of claim 1, wherein the wheel mount extends away from the leading end portion at an angle to the support frame plane, and wherein the angle is less than 90 degrees.

5. The cart of claim 1, wherein the wheel mount extends away from the leading end portion at an angle to the support frame plane, and wherein the angle is about 83 degrees in the rest position and about 55 degrees in the displaced position.

6. The cart of claim 1, further comprising a resistance member coupled to the support frame and the actuator bar to cause the actuator bar to return to the use position when the actuator wheel is dis-engaged with the vehicle's load entry surface.

7. The cart of claim 1, further comprising a trailing leg release, wherein the pair of trailing legs extend along a trailing leg plane that is substantially perpendicular to the support frame, and wherein the trailing legs are slideably coupled to the support frame such that the trailing legs are allowed to slide along the trailing leg plane when the trailing leg release is released.

8. The cart of claim 1, wherein the pair of leading legs is arranged perpendicular to the support frame in the use position, and the pair of leading legs are arranged at an angle between 0-30 degrees to the support frame in the collapsed position.

9. The cart of claim 1, wherein the distance from the end of the leading end portion of the front loading wheel to the leading end of the actuator wheel along the support frame in the rest position is about 3.5 inches, and the distance from the end of the leading end of the front loading wheel to the leading end of the actuator wheel along the support frame in the displaced position is about 5⅞ inches.

10. The cart of claim 1, further comprising loading wheels coupled to the leading end portion of the support frame, and wherein the actuator wheel is located along the support frame in between the loading wheels and the pivot location such that when the cart is loaded into the vehicle, the loading wheels provide support to the cart before the actuation system initiates release of the release mechanism.

11. The cart of claim 1, further comprising a cantilevered portion of the support frame, wherein the cantilevered portion extends forward of the pivot location to the leading end portion.

12. A method of loading a foldable cart into a vehicle, wherein the vehicle has a loading opening including a load entry surface, the method comprising:
   providing a foldable cart comprising:
      a support frame having a support surface extending from a leading end portion to a trailing end portion along a support frame plane, the support frame further including two tracks and a pair of loading wheels coupled to the leading end portion;
      a pair of leading legs extending along a leading leg plane, the leading legs pivotally coupled to the support frame at a pivot location closer to the leading end portion than the trailing end portion;
      a pair of trailing legs coupled to the support frame;
      a leading leg folding system comprising:
         a release mechanism to release the leading legs from a use position to a collapsed position, the release mechanism comprising:
            a track bar extending from one of the two tracks to the other of the two tracks and slideable therein;
            a lock that when engaged with the track bar is configured to maintain the cart in the use position;
            a leading leg support for transferring motion of the track bar to the leading leg, the leading leg support pivotably coupled to one of the leading legs and extending to and coupled to the track bar;
         an actuation system to initiate release of the release mechanism, the actuation system comprising:
            a wheel mount pivotably coupled to the support frame and having a free end portion;
            an actuator wheel coupled to the free end portion of the wheel mount, the actuator wheel located along the support frame in between the leading end portion and the pivot location;
a displaceable actuator bar extending from a first end portion to a second end portion;
an actuation slot disposed in the actuator bar first end portion, the wheel mount slideably coupled to the actuation slot;
a lock bar mount pivotably coupled to the second end portion; and
a lock bar pivotably coupled to the lock bar mount, the lock bar fixedly coupled to the lock,
pushing the cart into the vehicle, wherein pushing the cart into the vehicle comprises:
supporting at least a portion of the weight of the cart on the loading wheels;
engaging the actuator wheel with the load entry surface to actuate the actuator wheel; and
displacing the actuator wheel opposite the direction of motion of the cart, the displacement of the actuator wheel displacing the actuator bar opposite the direction of motion of the cart and causing rotation of the lock bar to releasing the lock from the track bar, wherein releasing the lock from the track bar allows the track bar to slide in the tracks in the direction opposite the direction of motion of the cart and the leading legs to pivot from the use position to the collapsed position; and
pushing the cart completely into the vehicle.

13. The method of claim 12, wherein the actuation slot is curved or L-shaped.

14. The method of claim 12, wherein the wheel mount extends away from the leading end portion at an angle to the support frame plane, and wherein the angle is less than 90 degrees.

15. The method of claim 12, the cart further comprising a trailing leg release, wherein the pair of trailing legs extend along a trailing leg plane that is substantially perpendicular to the support frame, and wherein the trailing legs are slideably coupled to the support frame such that the trailing legs are allowed to slide along the trailing leg plane, the method further comprising:
releasing the trailing leg release; and
lifting the trailing legs to slide them closer to the support surface.

16. The method of claim 12, the cart further comprising second loading wheels coupled to the support frame between the pivot location and the trailing legs, the method further comprising pushing the cart completely inside of the vehicle until the cart is supported by the loading wheels, the second loading wheels and the trailing leg wheels.

17. The method of claim 12, wherein actuation of the actuator wheel causes the actuator wheel to pivot closer to the support surface.

18. The method of claim 12, further comprising loading wheels coupled to the leading end portion of the support frame, and wherein the actuator wheel is located along the support frame in between the loading wheels and the pivot location such that when the cart is loaded into the vehicle, the loading wheels provide support to the cart before the actuation system initiates release of the release mechanism.

19. A foldable cart for loading in a vehicle, the vehicle having a loading opening including a load entry surface, the cart comprising:
a support frame having a support surface extending from a leading end portion to a trailing end portion along a support frame plane, the support frame including two tracks;
a pair of leading legs extending along a leading leg plane, the leading legs pivotally coupled to the support frame at a pivot location closer to the leading end portion than the trailing end portion;
a pair of trailing legs coupled to the support frame; and
a leading leg folding system comprising:
means for releasing the leading legs from a use position to a collapsed position, the releasing means including an actuator wheel,
wherein when the cart is loaded into the vehicle and the means for releasing the leading legs engages the load entry surface, the actuator wheel is displaced opposite the direction of motion of the cart and upwards towards the support frame to release the leading legs from the use position to the collapsed position.

20. The foldable cart of claim 19, further comprising front loading wheels coupled to the leading end portion of the support frame, the front loading wheels having a leading end and the actuator wheels having a leading end, and wherein the distance from the leading end of the front loading wheels to the leading end of the actuator wheel along the support frame plane is about 3.5 inches in the rest position.

* * * * *